(12) United States Patent
Kim et al.

(10) Patent No.: US 8,009,659 B2
(45) Date of Patent: Aug. 30, 2011

(54) PROVIDING CONGESTION AND TRAVEL INFORMATION TO USERS

(75) Inventors: Young In Kim, Seoul (KR); Chu Hyun Seo, Seoul (KR); Joon Hwi Lee, Seoul (KR); Seung Won Kim, Daejeon-si (KR)

(73) Assignee: LG Electronics Inc., Seoul (KR)

( * ) Notice: Subject to any disclaimer, the term of this patent is extended or adjusted under 35 U.S.C. 154(b) by 1054 days.

(21) Appl. No.: 11/624,424

(22) Filed: Jan. 18, 2007

(65) Prior Publication Data

US 2007/0167172 A1    Jul. 19, 2007

Related U.S. Application Data

(60) Provisional application No. 60/759,963, filed on Jan. 19, 2006.

(30) Foreign Application Priority Data

Jun. 21, 2006  (KR) .................. 10-2006-0055870

(51) Int. Cl.
*H04J 3/24* (2006.01)
*G08G 1/00* (2006.01)
*G01R 31/08* (2006.01)

(52) U.S. Cl. .................. 370/349; 701/117; 370/237

(58) Field of Classification Search .......... 710/200–226; 340/988–996, 905, 995.13, 539.1; 701/1, 701/117–119, 200, 207, 208, 24; 370/536, 370/252, 237, 232, 349; 455/404.2, 456.1
See application file for complete search history.

(56) References Cited

U.S. PATENT DOCUMENTS

| 4,907,159 | A | 3/1990 | Mauge |
| 5,649,297 | A | 7/1997 | Park |
| 5,662,109 | A | 9/1997 | Hutson |
| 5,933,100 | A | 8/1999 | Golding |
| 6,067,499 | A | 5/2000 | Yagyu et al. |
| 6,067,502 | A | 5/2000 | Hayashida et al. |
| 6,075,467 | A | 6/2000 | Ninagawa |
| 6,085,137 | A | 7/2000 | Aruga et al. |
| 6,101,443 | A | 8/2000 | Kato et al. |

(Continued)

FOREIGN PATENT DOCUMENTS

DE    19733179 A1    2/1998

(Continued)

OTHER PUBLICATIONS

European Search Report dated Oct. 23, 2009 for Application No. 09170601.0-2215.

(Continued)

*Primary Examiner* — Jack Keith
*Assistant Examiner* — Muhammad Shafi
(74) *Attorney, Agent, or Firm* — Fish & Richardson P.C.

(57) ABSTRACT

Processing link information related to traffic and travel information, in which link information is received including a link identification value associated with a particular link, a link identifier component enabling a determination of a link system to be employed in identifying the particular link referenced by the received traffic information, and a location type information component enabling a determination of a link location type of the particular link. Based upon the received information, a link system to be used to identify the particular link is determined. In addition, the link location type and the link identification are determined.

7 Claims, 12 Drawing Sheets

U.S. PATENT DOCUMENTS

| | | | |
|---|---|---|---|
| 6,115,667 A | 9/2000 | Nakamura | |
| 6,125,323 A | 9/2000 | Nimura et al. | |
| 6,128,571 A | 10/2000 | Ito et al. | |
| 6,232,917 B1 | 5/2001 | Baumer et al. | 342/357.13 |
| 6,236,933 B1 | 5/2001 | Lang | |
| 6,324,466 B1 | 11/2001 | Vieweg | |
| 6,401,027 B1 | 6/2002 | Xu | |
| 6,434,477 B1 | 8/2002 | Goss | |
| 6,438,490 B2 | 8/2002 | Ohta | |
| 6,438,561 B1 | 8/2002 | Israni | |
| 6,453,230 B1 | 9/2002 | Geurts | |
| 6,477,459 B1 | 11/2002 | Wunderlich | |
| 6,594,576 B2 | 7/2003 | Fan et al. | |
| 6,597,982 B1 | 7/2003 | Schmidt | |
| 6,610,321 B2 | 8/2003 | Huang et al. | |
| 6,611,749 B1 | 8/2003 | Berwanger | |
| 6,615,133 B2 | 9/2003 | Boies et al. | |
| 6,618,667 B1 | 9/2003 | Berwanger | |
| 6,633,808 B1 | 10/2003 | Schulz et al. | |
| 6,687,611 B1 | 2/2004 | Hessing et al. | |
| 6,741,932 B1 * | 5/2004 | Groth et al. | 701/210 |
| 6,810,321 B1 | 10/2004 | Cook | |
| 6,873,904 B2 | 3/2005 | Yamamoto et al. | |
| 6,904,362 B2 | 6/2005 | Nakashima et al. | |
| 6,924,751 B2 | 8/2005 | Hempel et al. | |
| 6,970,132 B2 | 11/2005 | Spilker, Jr. | |
| 6,990,407 B1 | 1/2006 | Mbekeani et al. | |
| 6,995,769 B2 | 2/2006 | Ordentlich et al. | |
| 6,996,089 B1 | 2/2006 | Ruf | |
| 7,013,983 B2 | 3/2006 | Matsumoto et al. | |
| 7,047,247 B1 | 5/2006 | Petzold et al. | |
| 7,106,219 B2 | 9/2006 | Pearce | |
| 7,139,467 B2 | 11/2006 | Seo et al. | |
| 7,139,659 B2 | 11/2006 | Mbekeani et al. | |
| 7,188,025 B2 | 3/2007 | Hudson | |
| 7,251,558 B1 | 7/2007 | McGrath | |
| 7,269,503 B2 | 9/2007 | McGrath | |
| 7,319,931 B2 | 1/2008 | Uyeki et al. | |
| 7,355,528 B2 * | 4/2008 | Yamane et al. | 340/995.13 |
| 7,373,247 B2 * | 5/2008 | Park | 701/208 |
| 7,375,649 B2 | 5/2008 | Gueziec | |
| 7,403,852 B2 | 7/2008 | Mikuriya et al. | |
| 7,609,176 B2 * | 10/2009 | Yamane et al. | 340/994 |
| 7,650,227 B2 * | 1/2010 | Kirk et al. | 701/117 |
| 7,657,372 B2 | 2/2010 | Adachi et al. | |
| 7,701,850 B2 | 4/2010 | Kim et al. | |
| 7,729,335 B2 | 6/2010 | Lee et al. | |
| 7,739,037 B2 | 6/2010 | Sumizawa et al. | |
| 7,877,203 B2 | 1/2011 | Mikuriya et al. | |
| 2001/0028314 A1 | 10/2001 | Hessing et al. | |
| 2003/0036824 A1 | 2/2003 | Kuroda et al. | |
| 2003/0083813 A1 | 5/2003 | Park | |
| 2003/0102986 A1 | 6/2003 | Hempel et al. | |
| 2003/0179110 A1 | 9/2003 | Kato | |
| 2004/0148092 A1 | 7/2004 | Kim et al. | |
| 2004/0198339 A1 | 10/2004 | Martin | 455/423 |
| 2004/0246888 A1 | 12/2004 | Peron | |
| 2004/0249560 A1 | 12/2004 | Kim et al. | |
| 2005/0027437 A1 | 2/2005 | Takenaga et al. | |
| 2005/0038596 A1 | 2/2005 | Yang et al. | |
| 2005/0081240 A1 | 4/2005 | Kim | |
| 2005/0107944 A1 | 5/2005 | Hovestadt et al. | |
| 2005/0141428 A1 | 6/2005 | Ishikawa | |
| 2005/0143906 A1 | 6/2005 | Ishikawa et al. | |
| 2005/0198133 A1 | 9/2005 | Karaki | |
| 2005/0206534 A1 | 9/2005 | Yamane | |
| 2005/0209772 A1 | 9/2005 | Yoshikawa | |
| 2005/0231393 A1 | 10/2005 | Berger | |
| 2006/0139234 A1 | 6/2006 | Tanaka | |
| 2006/0143009 A1 | 6/2006 | Jost et al. | |
| 2006/0173841 A1 | 8/2006 | Bill | |
| 2006/0178105 A1 | 8/2006 | Kim | |
| 2006/0178807 A1 | 8/2006 | Kato et al. | |
| 2006/0262662 A1 | 11/2006 | Jung et al. | |
| 2006/0265118 A1 | 11/2006 | Lee et al. | |
| 2006/0268721 A1 | 11/2006 | Lee | |
| 2006/0268736 A1 | 11/2006 | Lee et al. | |
| 2006/0268737 A1 | 11/2006 | Lee et al. | |
| 2006/0271273 A1 | 11/2006 | Lee et al. | |
| 2006/0281444 A1 | 12/2006 | Jung | |
| 2007/0005795 A1 | 1/2007 | Gonzalez | |
| 2007/0019562 A1 | 1/2007 | Kim et al. | |
| 2007/0122116 A1 | 5/2007 | Seo et al. | |
| 2009/0125219 A1 | 5/2009 | Lee et al. | |

FOREIGN PATENT DOCUMENTS

| | | |
|---|---|---|
| DE | 197 33 179 | 5/1998 |
| DE | 101 01 349 A1 | 1/2001 |
| DE | 100 60 599 A1 | 6/2002 |
| EP | 0 725 500 | 8/1996 |
| EP | 1 006 684 | 6/2000 |
| EP | 1 030 475 | 8/2000 |
| EP | 1 041 755 | 10/2000 |
| EP | 1 049 277 | 11/2000 |
| EP | 1 079 353 | 2/2001 |
| EP | 1 376 512 | 1/2004 |
| EP | 1 445 750 | 8/2004 |
| EP | 1 460 599 | 9/2004 |
| EP | 1150265 B1 | 10/2006 |
| GB | 2 342 260 | 4/2000 |
| JP | 09-062884 | 3/1997 |
| JP | 11-160081 | 6/1999 |
| JP | 2001-82967 | 3/2001 |
| JP | 2001-272246 | 10/2001 |
| JP | 2004-164373 | 6/2004 |
| JP | 2004-186741 | 7/2004 |
| JP | 2004-295736 | 10/2004 |
| JP | 2004-355662 | 12/2004 |
| JP | 2005-56061 | 3/2005 |
| KR | 10-1999-0025959 | 4/1999 |
| KR | 10-2001-0016252 | 3/2001 |
| KR | 10-2002-0017535 | 3/2002 |
| KR | 10-2003-0034915 | 5/2003 |
| KR | 10-2003-0037455 | 5/2003 |
| KR | 10-2004-0033141 | 4/2004 |
| KR | 10-2004-0084508 | 10/2004 |
| KR | 10-2005-0037776 | 4/2005 |
| KR | 10-2005-0062320 | 6/2005 |
| KR | 10-2006-0002468 | 1/2006 |
| KR | 10-2004-0084374 | 3/2006 |
| KR | 100565089 B1 | 3/2006 |
| KR | 10-2006-0063563 | 6/2006 |
| KR | 10-2006-0063629 | 6/2006 |
| KR | 10-2006-0076574 | 7/2006 |
| WO | WO 98/24079 | 6/1998 |
| WO | WO 98/26395 | 6/1998 |
| WO | WO 98/26396 | 6/1998 |
| WO | WO 98/41959 | 9/1998 |
| WO | WO 00/30058 | 5/2000 |
| WO | WO 00/36771 | 6/2000 |
| WO | WO 00/39774 | 7/2000 |
| WO | WO 01/06478 | 1/2001 |
| WO | WO 01/18767 | 3/2001 |
| WO | WO 01/18768 | 3/2001 |
| WO | WO 01/31497 | 5/2001 |
| WO | WO 02/01532 | 1/2002 |
| WO | WO 02/13161 | 2/2002 |
| WO | WO 02/082402 | 10/2002 |
| WO | WO2004036545 A1 | 4/2004 |
| WO | WO 2005/020576 | 3/2005 |

OTHER PUBLICATIONS

European Search Report dated Oct. 26, 2009 for Application No. 09170878.4-2215.

Notice of Allowance issued in U.S Appl. No. 11/419,095 dated Dec. 3, 2009.

Office Action issued in U.S. Appl. No. 11/419,127 dated Dec. 14, 2009.

European Search Report dated Nov. 4, 2009 issued in European Application No. 09171279.4-2215, 7 pages.

International Search Report mailed Sep. 6, 2006, issued in International Application No. PCT/KR2006/001843, filed May 17, 2006 (3 pages).

"TPEG TEC Application Specification," Working Document, Development Project, Mobile.Info, Mar. 9, 2006, 30 pages.

"Traffic and Travel Information (TTI)—TTI via Transport Protocol Experts Group (TPEG) Extensible Markup Language (XML_—Part 1: Introduction, common data types and tpegML," Technical Specification, ISO/TS 24530-1, First Edition, Apr. 15, 2006, 20 pages.
Bev Marks, "TPEG-Standardized at Last," Oct. 2005.
European Office Action and Search Report issued in Application No. 09159699.9-2215 dated Jun. 26, 2009.
European Search Report dated Jun. 20, 2008 for Application No. 06747461.9, 8 pages.
International Search Report dated Sep. 6, 2006 for Application No. PCT/KR2006/2002012, 2 pages.
Office Action issued in U.S. Appl. No. 11/419,187 dated Feb. 19, 2010, 30 pages.
Office Action issued in U.S. Appl. No. 11/424,111 dated Feb. 3, 2010, 21 pages.
Office Action issued in U.S. Appl. No. 11/419,164 dated Mar. 11, 2010, 32 pages.
European Search Report dated Jun. 30, 2008 for Application No. 06747440.3, 10 pages.
European Search Report dated Aug. 14, 2008 for Application No. 06747433.8, 11 pages.
European Search Report dated Sep. 25, 2008 for Application No. 06747435.3, 8 pages.
European Search Report dated Sep. 30, 2008 for Application No. 06747474.2, 8 pages.
European Search Report dated Oct. 15, 2008 for Application No. 06747434.6, 8 pages.
International Search Report dated Aug. 28, 2006 for Application No. PCT/KR2006/001836, 1 page.
International Search Report dated Aug. 28, 2006 for Application No. PCT/KR2006/001859, 1 page.
International Search Report dated Aug. 28, 2006 for Application No. PCT/KR2006/001860, 1 page.
International Search Report dated Sep. 6, 2006 for Application No. PCT/KR2006/001834, 1 page.
International Search Report dated Sep. 27, 2006 for Application No. PCT/KR2006/001837, 2 pages.
International Search Report dated Oct. 19, 2006 for Application No. PCT/KR2006/001835, 2 pages.
International Search Report dated Oct. 19, 2006 for Application No. PCT/KR2006/002068, 1 page.
Office Action dated Jan. 2, 2009 for U.S. Appl. No. 11/419,095, 32 pages.
Office Action dated Feb. 24, 2009 for U.S. Appl. No. 11/419,127, 32 pages.
Office Action dated Apr. 3, 2009 for U.S. Appl. No. 11/419,164, 37 pages.
Korean Office Action dated Nov. 11, 2006 for Application No. KR 10-2005-0086890. 3 pages.
International Search Report dated May 8, 2007, Application No. PCT/KR2007/000318, 3 pages.
International Search Report dated Apr. 25, 2007, Application No. PCT/KR2007/000324, 3 pages.
Final Office Action in U.S. Appl. No. 11/419,127 mailed Jul. 22, 2009, 18 pages.
U.S Office Action dated Jun. 7, 2010 for U.S. Appl. No. 11/419,127, 24 pages.
U.S Office Action dated Jul. 1, 2010 for U.S. Appl. No. 11/914,682, 11 pages.
U.S. Notice of Allowance dated Jul. 21, 2010 for U.S. Appl. No. 11/419,164, 15 pages.
U.S. Notice of Allowance dated Aug. 9, 2010 for U.S. Appl. No. 11/419,095, 17 pages.
U.S Final Office Action dated Aug. 13, 2010 for U.S. Appl. No. 11/419,187, 16 pages.
Final Office Action in U.S. Appl. No. 11/419,095 mailed Jul. 31, 2009, 35 pages.
European Search Report dated Sep. 4, 2009 for Application No. 09165793.2-2215, 9 pages.
Office Action issued in U.S. Appl. No. 11/419,164 dated Oct. 1, 2009, 30 pages.
Office Action issued in U.S. Appl. No. 11/419,178 dated Sep. 3, 2009, 10 pages.
Office Action Issued in U.S. Appl. No. 11/424,111 dated Aug. 11, 2009, 14 pages.
Tristan Ferree BBC Research & Development, TPEG C++ Library Documentation (v2.0), Mar. 20, 2002, 10 pages.
European Search Report dated Jul. 30, 2008 for Application No. 06747437.9, 9 pages.
European Search Report dated Nov. 17, 2008 for Application No. 06747441.1, 7 pages.
Office Action dated Dec. 1, 2008 for U.S. Appl. No. 11/424,111, 22 pages.
U.S. Notice of Allowance and Fee(s) Due for U.S. Appl. No. 11/419,127 dated Aug. 23, 2010, 17 pages.
U.S. Notice of Allowance and Fee(s) Due for U.S. Appl. No. 11/419,164 dated Sep. 8, 2010, 11 pages.
U.S. Office Action for U.S. Appl. No. 11/419,187 dated Aug. 13, 2010, 16 pages.
U.S. Notice of Allowance and Fee(s) Due for U.S. Appl. No. 11/419,127 dated Dec. 13, 2010, 17 pages.
U.S. Non-Final Office Action dated Feb. 3, 2011 for U.S. Appl. No. 11/419,178, 12 pages.
U.S. Non-Final Office Action dated May 6, 2011 for U.S. Appl. No. 11/424,111, 20 pages.

* cited by examiner

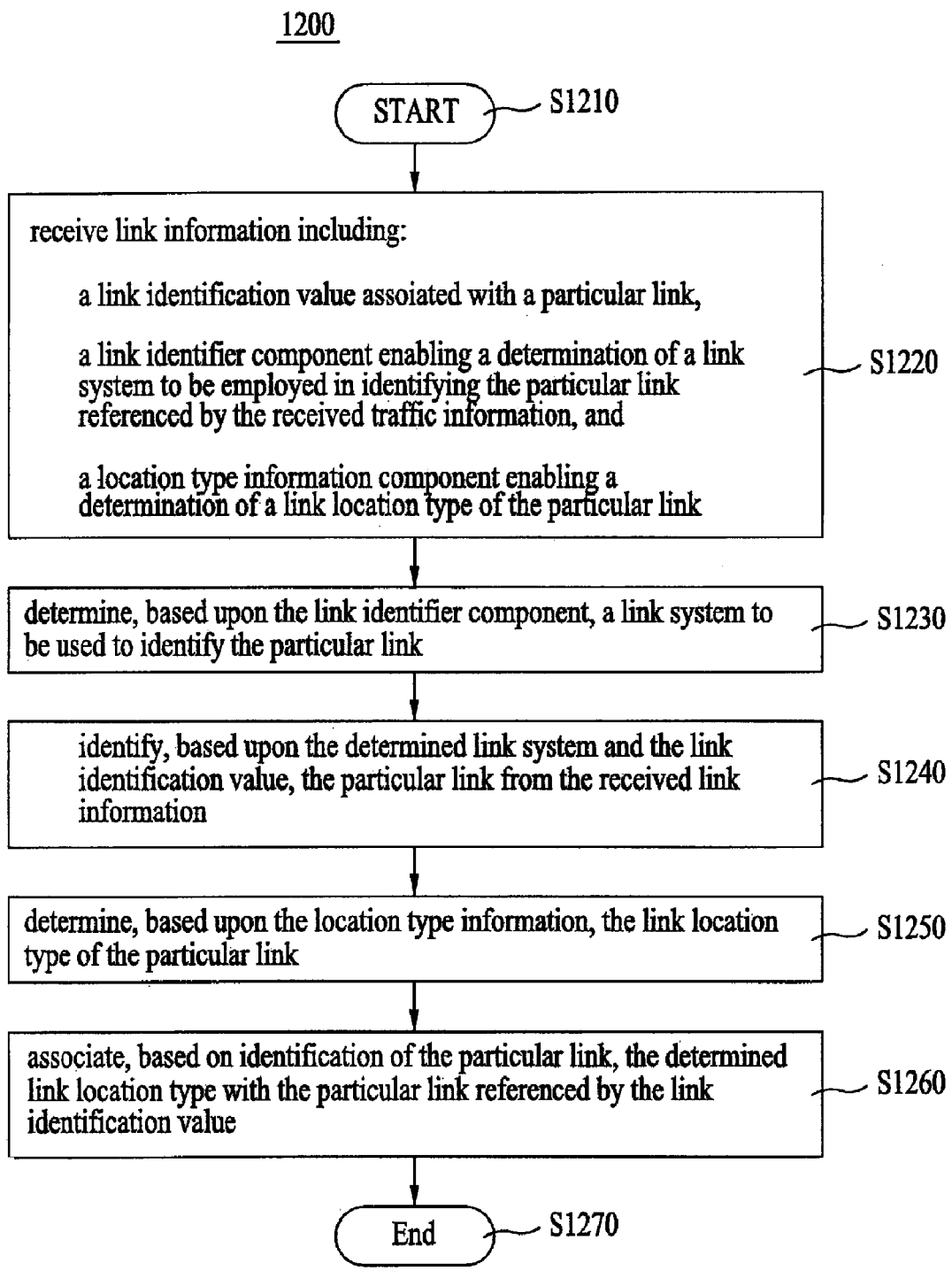

PROVIDING CONGESTION AND TRAVEL INFORMATION TO USERS

CROSS-REFERENCE TO RELATED APPLICATIONS

This application claims priority to Korean Patent Application No. 10-2006-0055870, filed on Jun. 21, 2006, and claims the benefit of U.S. Provisional Application No. 60/759,963, filed Jan. 19, 2006. Both documents are incorporated by reference herein in their entirety.

BACKGROUND OF THE INVENTION

1. Field of the Invention

The present disclosure relates to travel information systems, and one particular implementation relates to providing traffic congestion and travel information to users.

2. Discussion of the Related Art

Personal and business travel have grown tremendously throughout the world, leading to an increasing need to inform drivers about changing travel conditions. Traditionally, traffic and travel information has been communicated to drivers via audio broadcasts using a radio. Recent advancements in telecommunications, however, have made it possible to deliver traffic information to drivers through various communications channels, such as conventional radio, digital audio broadcasting ("DAB"), television broadcasts, Global Positioning System ("GPS"), and Internet.

As a result, the need to devise a unified method for organizing and transmitting travel information has arisen. To address this issue, the Transport Protocol Experts Group ("TPEG") was founded in 1997 by the European Broadcasting Union to define a standard for transmission of language independent multi-modal Traffic and Travel Information ("TTI") over a variety of communications channels.

SUMMARY OF THE INVENTION

According to one general implementation, a link information is received including a link identification value associated with a particular link, a link identifier component enabling a determination of a link system to be employed in identifying the particular link referenced by the received traffic information, and a location type information component enabling a determination of a link location type of the particular link. A link system to be used to identify the particular link is determined based upon the link identifier component. The particular link from the received link information is identified based upon the determined link system and the link identification value. The link location type of the particular link is determined based upon the location type information. In addition, the determined link location type is associated with the particular link referenced by the link identification value based on identification of the particular link.

Implementations may include one or more of the following features. For example, the link identifier component may includes a link system identifier value. Determining a link system to be used to identify the particular link may include comparing the link system identifier value with an entry in a link system look-up table. The entry may be indicative of a standard link system, such as a Korea Standard link system prescribed by the Ministry Of Construction & Transportation (MOCT) of the Republic of Korea.

Furthermore, the location type component may include a location type identifier value, such that determining the link location type of the particular link may include comparing the location type identifier value with an entry in a location type look-up table. The link system may be a vertex-based link system, where the link identification value is indicative of one or more vertices and identifying the particular link from the received link information is further based upon the one or more vertices. Alternatively, the link system may also be a reference string-based link system, such that the link identification value is indicative of a reference string and identifying the particular link from the received link information is further based upon the reference string.

The link information may further include a link descriptor string value associated with the particular link, and a link descriptor component enabling a determination of a link descriptor type to be employed in identifying the link descriptor. The link descriptor type to be employed to identify links may be determined based upon the link descriptor component. Additionally, the particular link descriptor from the received traffic information may be identified based upon the determined link descriptor type and the link descriptor string.

Identifying the particular link from the received link information may include comparing the link identification value with an entry in a link identification look-up table. The particular link may be associated with a predetermined link identification value in the link identification look-up table. The link identification value may be unique to the particular link. Identifying the particular link from the received traffic information may further include storing an entry in the link identification look-up table.

According to another general implementation, an apparatus for identifying information for at least one link includes a receiving device configured to receive link information. The link information includes a link identification value associated with a particular link, a link identifier component enabling a determination of a link system to be employed in identifying the particular link referenced by the received traffic information, and a location type information component enabling a determination of a link location type of the particular link. The apparatus also includes a processing device configured to determine a link system to be used to identify the particular link based upon the link identifier component, to identify the particular link from the received link information based upon the determined link system and the link identification value, to determine the link location type of the particular link based upon the location type information, and to associate, based on identification of the particular link, the determined link location type with the particular link referenced by the link identification value.

BRIEF DESCRIPTION OF THE DRAWINGS

FIG. 12 is a flowchart illustrating an exemplary process for identifying at least one link.

Like reference numbers represent corresponding parts throughout.

DETAILED DESCRIPTION OF THE INVENTION

Figure 1:
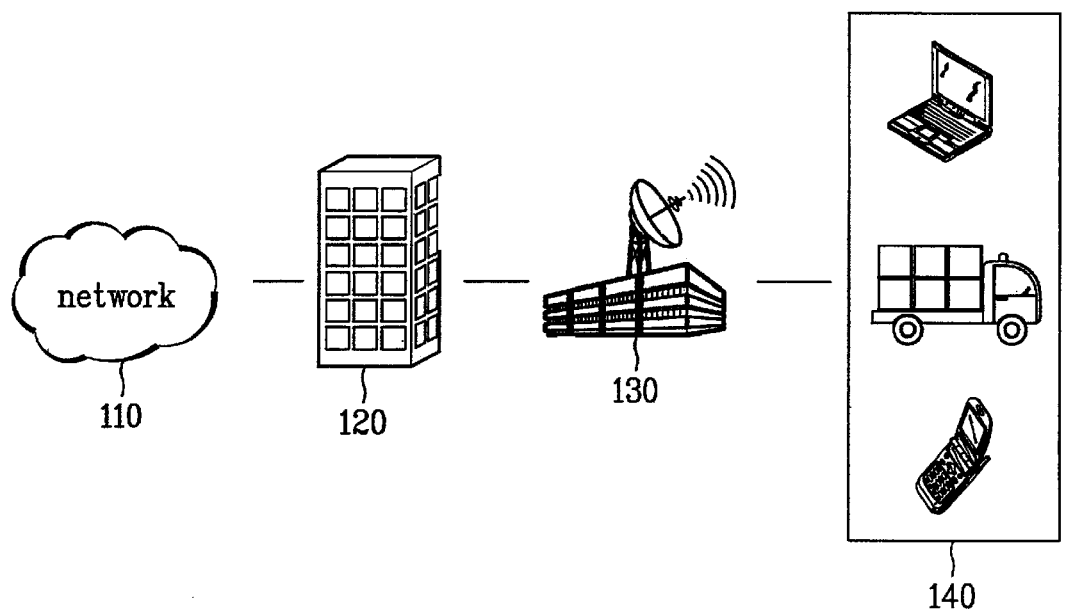
FIG. 1 shows an exemplary broadcast system for providing traffic information.

FIG. 1 illustrates an exemplary broadcast system 100 for providing traffic information. The broadcast system 100 may include a network 110, a provision server 120, a broadcast center 130, and a terminal 140. The network 110 may be a local area network, a wide area network, or any other wireless or wireline communications network. Network data associated with traffic information is collected from the network 110. The collected data is processed at the provision server 120 to form processed traffic information, and forwarded to the broadcast center 130. The broadcast server 130 then broadcasts the processed traffic information to the terminal 140.

In more detail, the provision server 120 collects data associated with traffic information from a variety of sources embodied in the network 110, including system administrators, wireline/wireless Internet, or digital broadcast services, such as Transparent Data Channel ("TDC") or Multimedia Object Transport ("MOT"). The traffic information may include information about various transportation conditions for land, sea, and air travel, such as accidents, road conditions, traffic congestions, road construction/closures, public transportation delays, airline delays, and others.

The provision server 120 processes the collected data and places it in a transmission frame of a predetermined format, such as a TPEG format. For example, in case of a TPEG format, a TPEG frame includes a field indicating a number of the TPEG messages contained in the TPEG frame, as well as a sequence of the actual TPEG messages. A TPEG message may include public transportation information, Congestion and Travel Time ("CTT") information, road transportation information, emergency event information, as well as other fields.

The broadcast center 130 receives the processed traffic information from the provision server 120. The broadcast center 130 then transmits the processed traffic information via a variety of digital broadcast standards to the terminal 140. The transmission standards may include a European DAB standard based on Eureka-147 [ETSI EN 300 401], a Digital Video Broadcasting-Terrestrial ("DVB-T") standard, a Digital Video Broadcasting-Handheld ("DVB-H") standard, a Media Forward Link Only ("FLO") standard, a Digital Multimedia Broadcasting ("DMB") standard, or another standard. In one example, the DMB standard is the DMB service of the Republic of Korea that is classified into a Terrestrial Digital Multimedia Broadcasting ("T-DMB") service based on the Eureka-147 and a Satellite Digital Multimedia Broadcasting ("S-DMB") service based on satellite communications. In addition, the broadcast center 130 may transmit traffic information via the Internet and/or other wireless and wireline networks.

The terminal 140 may be a personal computer (e.g., a navigator or a notebook), a personal digital assistant ("PDA"), a navigational system equipped with a GPS, or any other computer-based system used for viewing traffic information. The terminal 140 receives TPEG data in the TPEG format from the broadcast server 130, processes the received data and provides a user with a graphical, textual, and/or audio presentation of the processed data.

Figure 2:
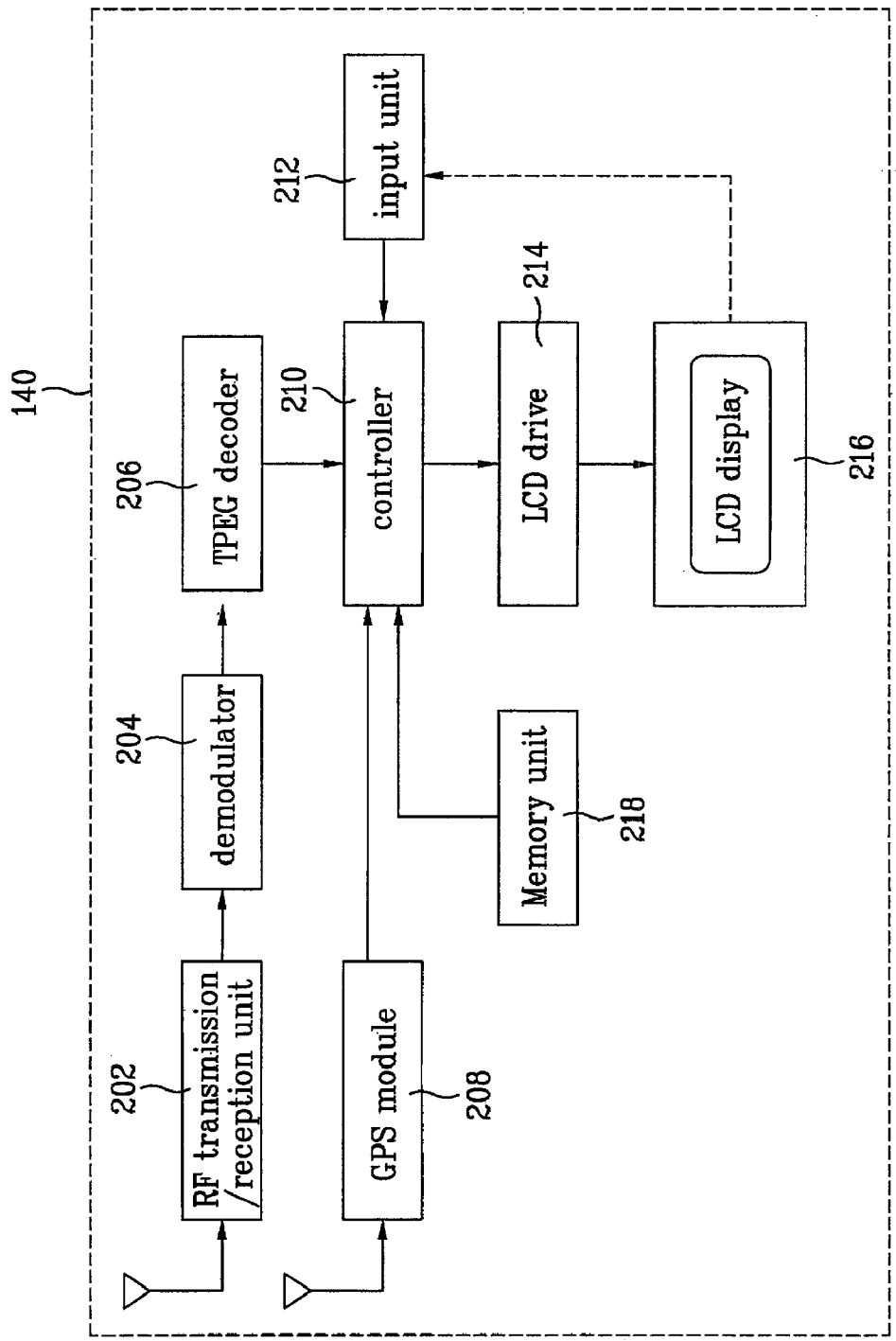
FIG. 2 is a block diagram of a terminal used for receiving traffic information.

FIG. 2 is a block diagram of the terminal 140 used for receiving traffic information. The terminal 140 may include a Radio Frequency ("RF") transmission/reception unit 202, a demodulator 204, a TPEG decoder 206, a GPS module 208, a controller 210, an input unit 212, an LCD controller 214, a liquid crystal display ("LCD") display 216, and a memory unit 218.

The RF transmission/reception unit 202 receives broadcast TPEG data, and the received TPEG data is demodulated by the demodulator 204. The demodulated TPEG data is decoded by the TPEG decoder 206 into a TPEG frame that may be processed by the controller 210. The TPEG decoder 206 may separate the decoded TPEG frame into a TPEG message sequence, analyze TPEG messages in the sequence, and output TPEG related information to the controller 210.

Furthermore, the terminal 140 may includes the GPS module 208 that receives satellite signals from low-orbit satellites. The GPS module 208 processes information received from the satellites to compute the location of the terminal 140. For example, the GPS module 208 may compute the present longitude, latitude, or altitude of the terminal 140.

The controller 210 receives location information from the GPS module 208 and TPEG frames from the TPEG decoder 206. The controller 210 also interfaces with the memory unit 218 that stores data received from the TPEG decoder 206. The stored data may include control signals and/or traffic information. For example, traffic information may include information about current/predicted link speed or current/predicted travel time. The memory unit 218 may be configured to store a predetermined amount of traffic information. For instance, the memory unit 218 may store predictions about traffic patterns in twenty-minute increments for a total of one hour.

The memory unit 218 may also store various geographic data, including topological information, such as graphs with links or nodes, as well as graphical maps. In particular, the topological information may be represented as a graph that includes a set of vertices connected by links. A vertex may represent a location, such as a building, a city, or a specific address. A link represents a road or a collection of roads that lead to that location.

A link may be identified by a variety of link identifiers. In one example, a link identifier may include the coordinates (e.g., latitude and longitude) of the link's vertices. In another example, a link identifier may include a link ID that corresponds to that link. The link ID may be a character string, a number, or a combination of both, such as "0_Euclid_1234_Washington_DC_US." In yet another example, a link identifier may be a name, such as "Euclid Street."

The controller 210 may be structured and arranged to convert between different types of link identifiers. For example, the controller 210 may convert link coordinates to a link ID or extract a link name from a given link ID. Similarly, the controller 210 may convert a link ID to a set of link coordinates. The controller 210 may convert between link coordinates based on a link identification look-up table. For example, the controller 210 may look up a link identifier "0_Euclid_1234_Washington_DC_US" in the link identification look-up table and determine that it corresponds to a link with vertices at coordinates (350, 507). In addition, the controller 210 may also be configured to store a link identifier in the link identification look-up table. In one example, when the value of a particular link identifier is not stored in the link identification look-up table, the controller 210 may store that value in the link identification look-up table for future reference.

The controller 210 may be structured and arranged to compute routes between destinations represented by vertices in a graph. A route from one vertex to another may be computed using various routing algorithms, such as the Dijkstra's algorithm. For example, if the vertices of a graph represent cities and link weights represent driving distances between pairs of cities connected by a direct road, the Dijkstra's algorithm may be used to find the shortest route between the two cities. The Dijkstra's algorithm uses link weight as its routing metric. A link may be assigned a weight based on a variety of routing metrics, such as a link distance, an average speed, a predicted average speed, a travel time, a predicted travel time, a congestion status, a proximity to a point of interests, or a number of other metrics. Based on link weights, the controller 210 may calculate a shortest route to a destination, such that the calculated route to the destination has the smallest aggregate weight. The calculated route may be presented to a user as a set of travel directions, for example by identifying street names or turns.

The controller 210 may compute directions and display these directions on the graphical maps to a user of the terminal 140. The maps are displayed on the LCD display 216 that is controlled by the LCD controller 214. In addition, the controller 210 may receive user input information from the input unit 212, which may be a touch-screen, a keypad, a jog-dial, or a point-stick.

Additionally, the controller 210 may control the LCD display 216 to display one or more routes to a user-specified destination. For example, the LCD display 216 may be configured to display information about specific links in a route. Thus, for a given link, the LCD display 216 may be configured to display an average speed history, an average link travel time history, a predicted link average speed, and a predicted link travel time. Both historical and predicted link information may be presented to a user in graphical, textual, or numerical forms, or in combinations of the above.

Depending on user's preferences, the presented information may be displayed by the LCD display 216 using different units. For example, a vehicle speed may be shown to a user in km/hour and/or miles/hour. Furthermore, the LCD display 216 may also show a name of a currently traversed link, such as a road name. Therefore, if a user is driving on a particular road, the LCD display 216 may show the name of that road. The road name may be deduced from a received TPEG message or from a local electronic map stored in the memory unit 832.

Figure 3:
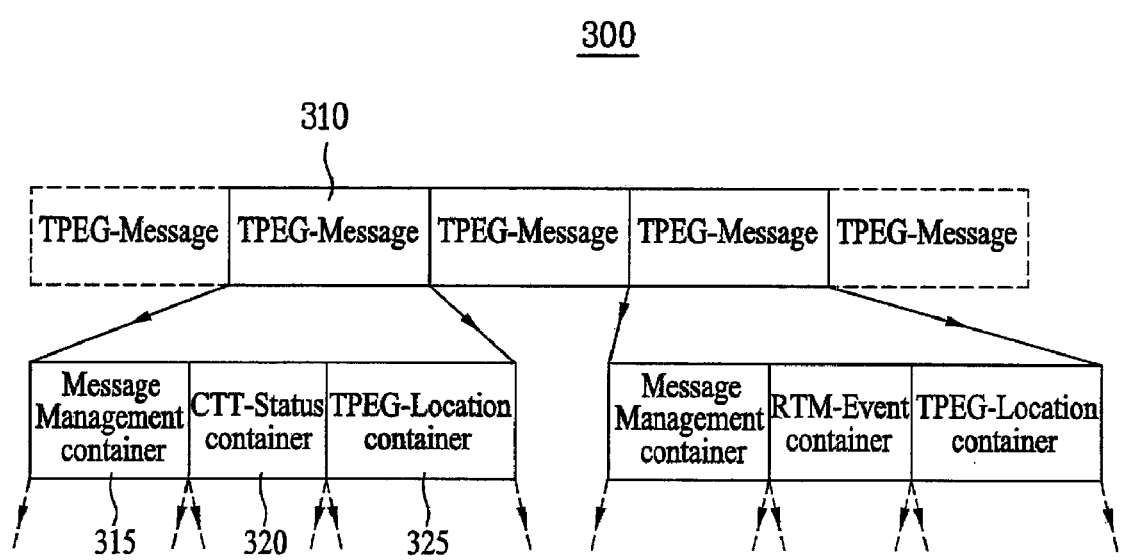
FIG. 3 illustrates an exemplary TPEG frame.

FIG. 3 illustrates an exemplary TPEG frame 300. The TPEG frame 300 may include one or more TPEG messages 310, where each TPEG message 310 may include a message management container 315, a CTT-status container 320, and a CTT location container 325. The CTT status container 320 includes a number of CTT components that will be discussed in more detail with respect to FIGS. 5-7. The TPEG location container 325 includes a number of TPEG location components that will be later discussed in more detail with respect to FIGS. 9-10.

The message management container 315 may include at least some of the fields specified in Table 1. In particular, a message identifier ("MID") field uniquely identifies a given message associated with an individual status of a service component. The MID value is incrementally increased from 0 to 65535 by an increment of 1, and is reset to 0 when the MID value reaches 65535. A version number ("VER") field identifies a sequential number of successive messages having the same MID. The value of the VER field may be sequentially increased from 0 to 255.

TABLE 1

| | |
|---|---|
| MID | Message Identifier |
| MGT | Message Generation Date and Time |
| MET | Message Expiry Date and Time |
| VER | Version Number |
| STA | Start Date and Time |
| STO | Stop Date and Time |
| SEV | Severity |
| UNV | Unverified Information |

Figure 4:
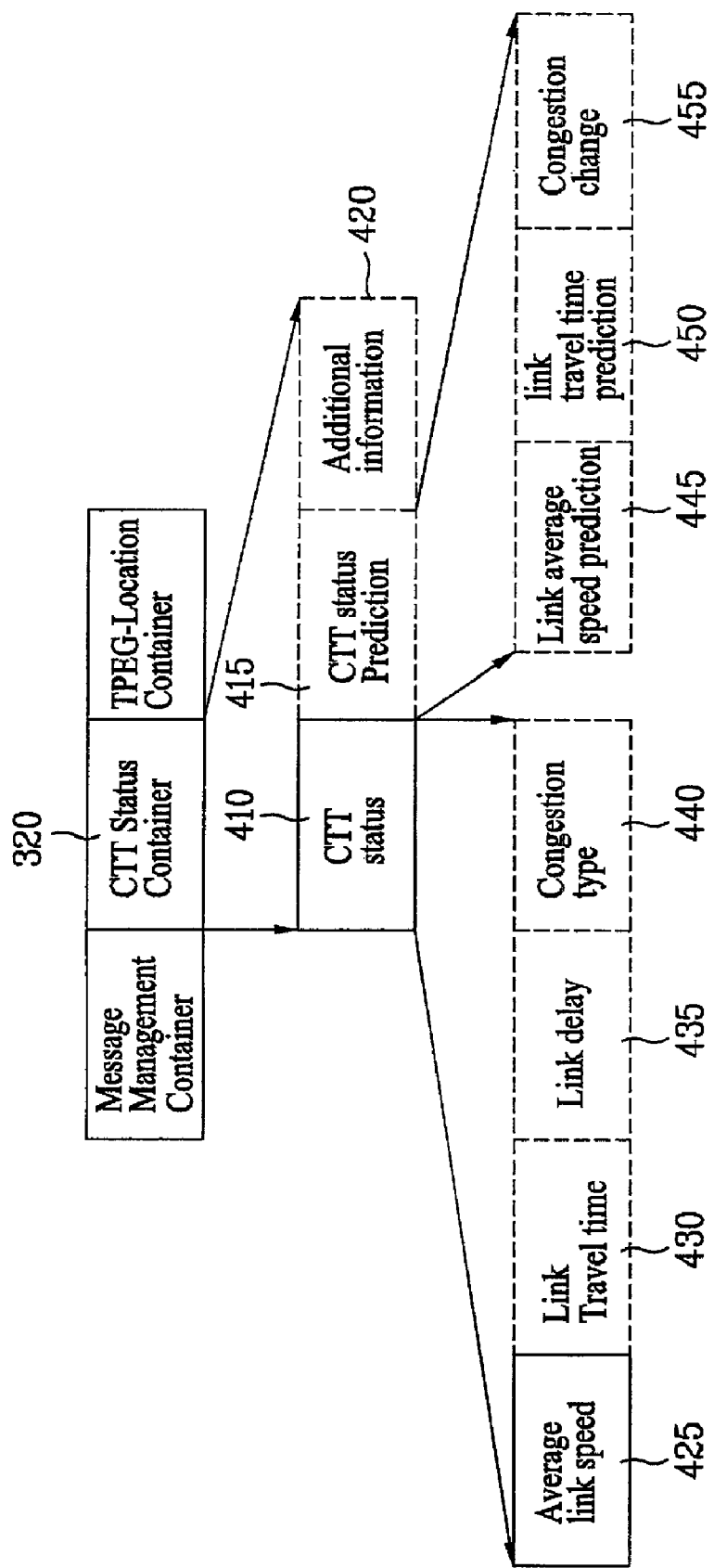
FIG. 4 shows an exemplarily hierarchical structure of a Congestion and Travel Time ("CTT") status container.

FIG. 4 shows an exemplarily hierarchical structure of a CTT status container 320. The CTT status container 320 includes a CTT status component 410, a CTT status prediction component 415, and an additional information component 420. Each TPEG message may be assigned a hex identification ("ID"). In one example, the CTT status component 410 is assigned an ID of "80 hex," the CTT status prediction component 415 is assigned an ID of "81 hex," and the additional information component 420 is assigned an ID of "8A hex." Other exemplarily identifiers for components 425-455 are shown in parenthesis in the description that follows.

The CTT status component 410 includes an average link speed component 425 ("00 hex"), a link travel time component 430 ("01 hex"), a link delay component 435 ("02 hex"), and a congestion type component 440 ("03 hex"). Status components 425-455 may also be assigned hex identifiers.

The CTT status prediction component 415 includes a link average speed prediction component 445 ("00 hex"), a link travel time prediction component 450 ("01 hex"), and a congestion type component 455 ("02 hex").

The additional information component 420 may include auxiliary data that is transmitted as part of a TPEG message. The auxiliary data may be text data or audio/video data. For example, the congestion type component 440 may be represented as a predefined code or a text string stored in the additional information component 420. In another example, the additional information component 420 may store video data, such as an image of a moving traffic for a link or road described in a received TPEG message. The video data may include moving images and/or still images. In yet another example, the additional information component 420 may store data describing various places of interest, such as theatres or restaurants, associated with a link described in a TPEG message.

Figure 5:
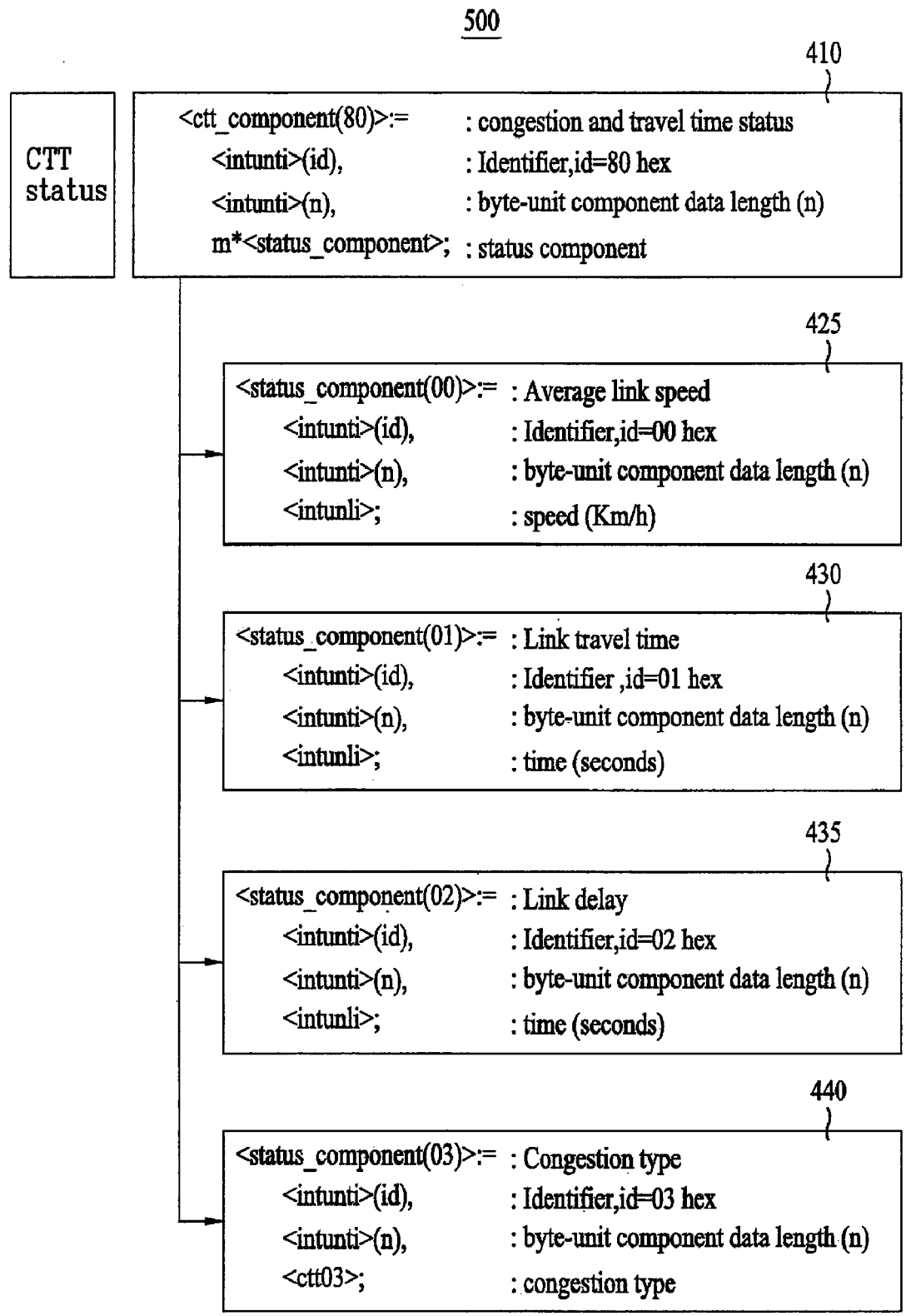
FIG. 5 illustrates an exemplarily data structure for a CTT status component.

FIG. 5 illustrates the exemplarily data structures for the CTT status component 410. As discussed, the CTT status component 410 includes the average link speed component 425, the link travel time component 430, the link delay component 435, and the congestion type component 440. By way of an example, the data structures for components 410 and 425-440 are specified using the C/C++ syntax. In particular, Table 2 shows some of the exemplarily variable types used to describe the exemplary structures for components 410 and 425-440.

TABLE 2

| Type | Description |
|---|---|
| byte | 8 bit byte |
| intsili | 16 bit-integer signed little |
| intsilo | 32 bit-integer signed long |
| intsiti | 8 bit-integer signed tiny |
| intunli | 16 bit-integer unsigned little |
| intunlo | 32 bit-integer unsigned long |
| intunti | 8 bit-integer unsigned tiny |
| short_string | a string |
| status_component | a data structure that may include other |

TABLE 2-continued

| Type | Description |
|---|---|
| | data structures |
| m* | pointer to a data structure, may indicate multiple components within |

As seen from FIG. 5, the exemplarily data structures may include an "identifier" field of type <intunti>. For example, the <ctt_component> data structure is assigned an identifier with a hex value of "80." In another example, the average link speed <status_component> is assigned an identifier of "00," while a link travel time <status_component> is assigned an identifier of "01." In addition, the exemplarily data structures may include a "byte-unit component data length" field of type <intunti>, which specifies a byte-length of a given data structure. Furthermore, the exemplarily data structures of FIG. 5 may include fields that store information specific to the particular types of the data structures. Thus, a data structure for the link travel type component 430 includes a "time" field of type <intunli>, while a data structure for the congestion type component 440 includes the "congestion type" field of type <ctt03>. In one specific example, the "congestion type" field may have a value "ctt03_1" for a smooth traffic flow, a value of "ctt03_3" for a low-speed traffic flow, and a value of "ctt03_4" for a congested flow.

Furthermore, the exemplarily data structures of FIG. 5 may include pointers to other data structures, such as the CTT status container 410 that includes pointers to <status_component> data structures representing components 425-440.

Figure 6:
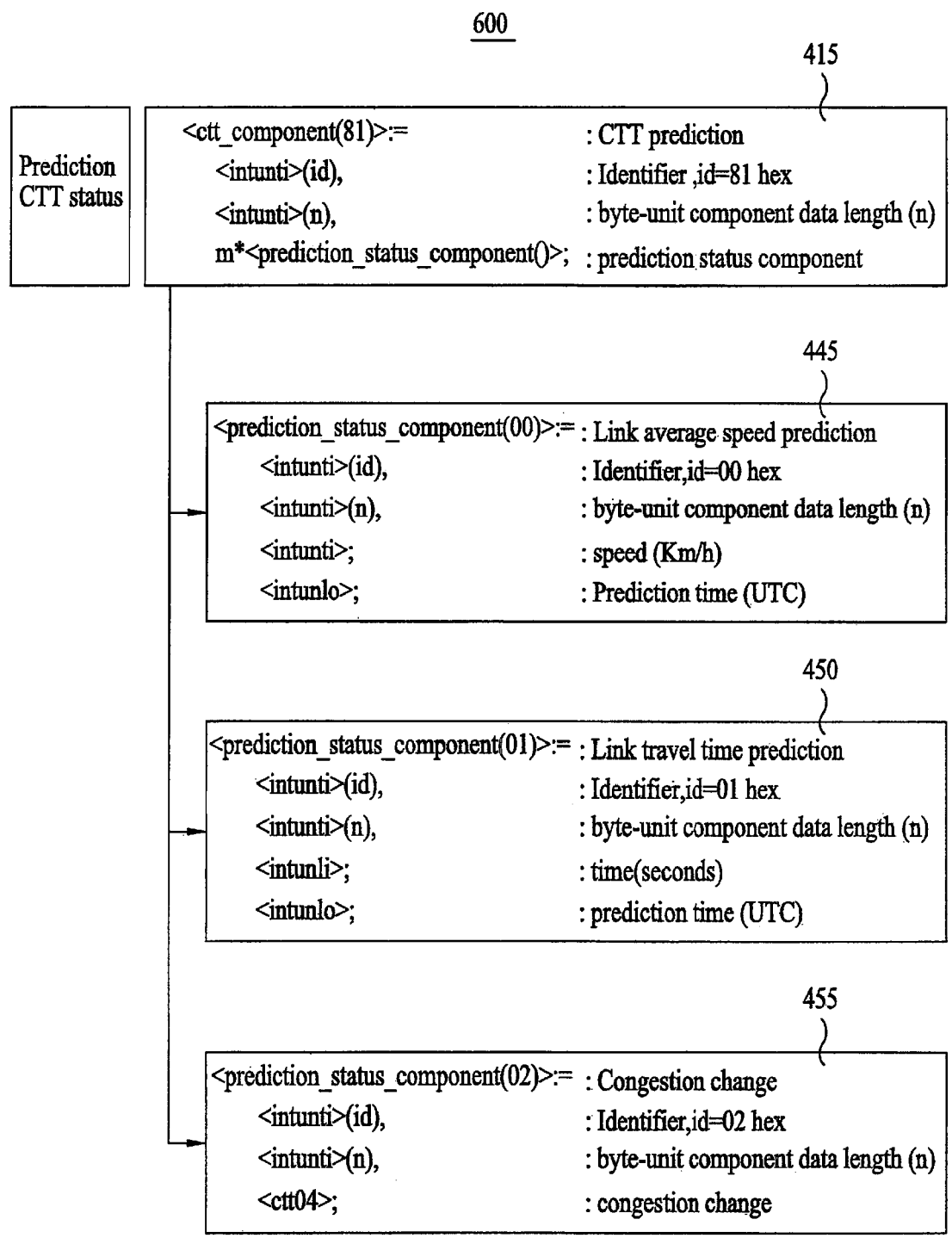
FIGS. 6 and 7 illustrate exemplarily data structures for a CTT status prediction component and an additional information component, respectively.
Figure 7:
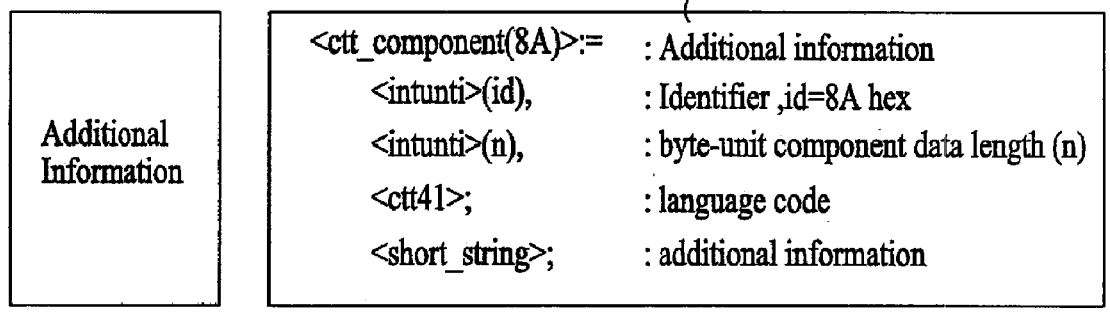

FIGS. 6 and 7 illustrate the exemplarily data structures for the CTT status prediction component 415 and the additional information component 420, respectively. The data structures described in FIGS. 6 and 7 are organized similarly to the data structures described in FIG. 5. Thus, components 415 and 420 are also specified using the C/C++ syntax. Likewise, the exemplarily data structures of FIGS. 6 and 7 may be assigned identifiers. For example, a data structure corresponding to the CTT status prediction component 415 is assigned a hex identifier with a value of "81." A data structure corresponding to the additional information component 420 is assigned an identifier with a value of "8A."

Figure 8:
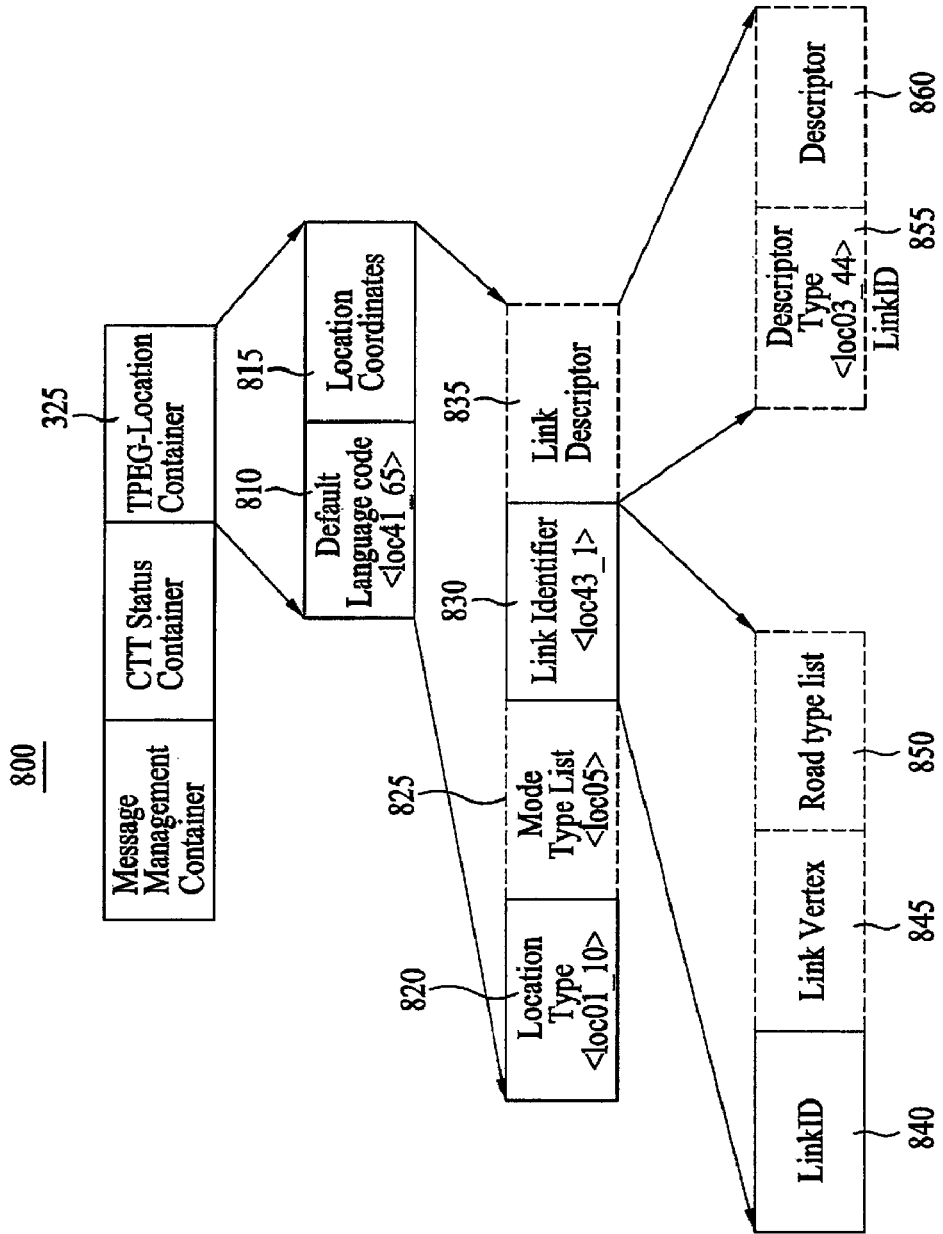
FIG. 8 shows an exemplarily hierarchical structure of a TPEG location container.

FIG. 8 shows an exemplarily hierarchical structure of a TPEG location container 325. The TPEG location container 325 includes a default language code component 810 and a location coordinates component 815. The default language code component 810 indicates a default language for the location coordinates component 815.

The location coordinates component 815 includes a location type component 820 enabling a determination of a link location type of a particular link. The location type component 820 identifies a type of a location. For example, a location type may be a "node area," an "intersection point," a "connection point," or others. An exemplary list of possible predetermined codes for the location coordinates component 815 is provided in Table 3. The predetermined codes are utilized instead of fuller textual descriptors to reduce the size of transmitted TPEG messages.

TABLE 3

| Code | Categories | Explanation |
|---|---|---|
| 0 | unknown | unknown |
| 1 | decided area | Large Area |
| 2 | node area | Nodal Area |
| 3 | segment | Segment |

TABLE 3-continued

| Code | Categories | Explanation |
|---|---|---|
| 4 | reserved field | Reserved for future use |
| 5 | Intersection point | Intersection Point |
| 6 | structured point | Framed Point |
| 7 | non-linked point | Non-Linked Point |
| 8 | connection point | Connected Point |
| 9 | simple segment | Simple Segment |
| 10 | link identifier | Link ID |
| ... | Versions 0, 9, and last | |
| ... | | |
| 255 | | |

The location coordinates component 815 also includes a mode type list component 825 that identifies the transportation types available around the location, such buses, ships, airplanes, vehicles, and others.

The location coordinates component 815 also includes a link identifier component 830 and a link descriptor component 835. The link identifier component 830 enables a determination of a link system to be employed in identifying a particular link. For example, the link ID component 840 may identify a link. However, because a link ID may be encoded according to the standard of any one of the several link systems, the link identifier component 830 may be used to determine which one of standardized link systems is used to describe the link ID.

In one example, the link identifier component 830 may include a link system identifier value (e.g., a code), such that a link system of the link ID may be determined by comparing the link system identifier value with an entry in a link system look-up table. The entry in the link system look-up table may be indicative of a standard link system, such as an intelligent traffic system prescribed by Ministry of Construction & Transportation ("MOCT") of the Republic of Korea. In another example, the link identifier component 830 may directly specify a standard link system.

Table 4 shows some exemplary codes that may be included in the link identifier component 830.

TABLE 4

| Code | Categories | Contents |
|---|---|---|
| 0 | Unknown | Unused |
| 1 | country code - link ID | Intelligent traffic system standard node link defined by MOCT |
| ... | Versions 0, 9, and last | |

As previously described, the link identifier component 830 includes a link ID component 840 associated with a particular link, such as a road. The link ID may be unique to a particular link. The link ID may be globally unique or unique within a predetermined geographic region. In one example, the link ID component 840 may be specified using code values prescribed by various communications standards, such as the Intelligent Traffic System standard. In another example, the link ID may include coordinates (e.g., latitude and longitude) of the link's vertices. In yet another example, the link ID may be a character string, a number, or a combination of above, such as "0_K_Ave_3456_Atlanta_US."

The link identifier component 830 also includes a link vertex component 845. The link vertex component 845 identifies the type of vertices that are created by a link, so that the link can be more precisely depicted on a map. A higher number of vertices allow the controller 210 provide more accurate maps or directions. For example, if the link vertex component 845 includes 100 vertices, the map may be displayed in a VGA mode. On the other hand, if the link vertex component 845 includes 1000 vertices, the map may be displayed in a higher resolution, such as SVGA. Finally, the link identifier component 830 includes a road type list component 850 that identifies the type of a road represented by the link.

The descriptor component 835 includes auxiliary or additional data. For example, the descriptor component 835 may include text, audio, and/or visual data that further describes the link identified by the link identifier component 830. In particular, the descriptor component 835 may include a descriptor type component 855 and a descriptor component 860. The descriptor type component 855 may be a predetermined code identifying the type of the descriptor. In one example, a value of "5" for the descriptor type component 855 indicates that that the descriptor is a "link name." The descriptor component 860 may be a string that provides addition information about the link. For example, when the descriptor type component 855 indicates that the link descriptor is a "link name," the link descriptor component 860 may be set to a string name, such as a "Maple Drive." The exemplarily codes used by the descriptor type component 855 are shown in Table 5.

Figure 11A:
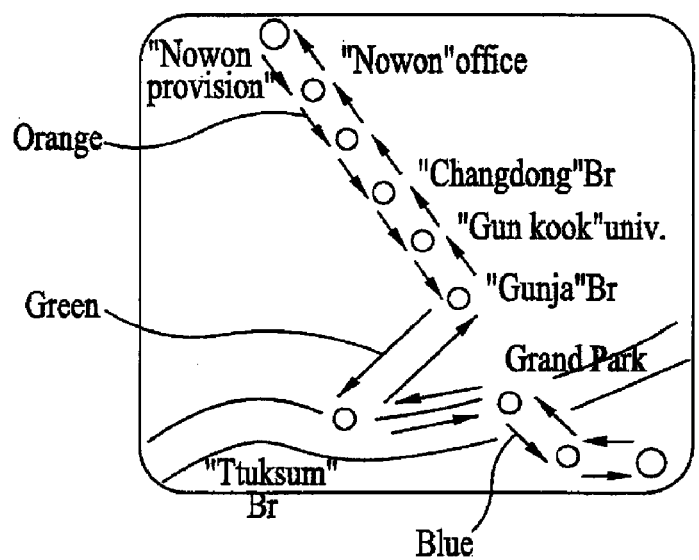
FIGS. 11A and 11B show exemplary images of displayed traffic information using a CTT status component and a TPEG location component.
Figure 11B:
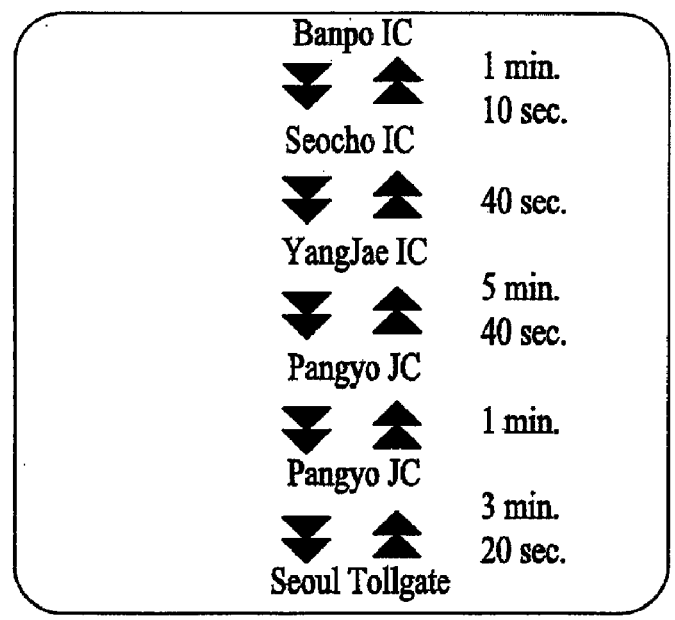

FIGS. 11A and 11B show exemplary images of displayed traffic information using the CTT status component 410 and the TPEG location component 325. The CTT status component 410 includes information related to traffic conditions, which may be graphically conveyed to a user on the LCD display 216. In one example, the color of the displayed link, such as a road or a pathway, may indicate a congestion status of the link. The information about congestion status may be obtained from the congestion type component 440. Thus, a congested road with a traffic moving at 0-10 km/hour is colored red, a somewhat congested road with a traffic moving at 10-20 km/hour is colored orange, an uncongested road with traffic moving at 20-40 km/hour is colored green, and an empty road is colored blue. In another example, a link speed may also be represented by a numeral or a text string. The congestion status of a road may also be displayed along with travel directions.

In yet another example, the congestion change information included in the congestion change component 455 may be displayed on a graphical map. Specifically, a change in traffic may be represented to a user graphically, numerically, or textually. Thus, the user may see a flashing road changing its

TABLE 5

| Descriptor Code | CEN_English 'Word' | Descriptor | Example |
| --- | --- | --- | --- |
| 0 | unknown | | in Denmark: Schwarzwald |
| 1 | area name | | |
| 2 | Node name | | |
| 3 | From name(segment) | | |
| 4 | To name(segment) | | |
| 5 | link name | road name, e.g., Maple Drive | |
| 6 | Local link name | | |
| 7 | tpegOilc name 1 | | |
| 8 | tpeg-ilc name 2 | | |
| 9 | tpeg-ilc name 3 | | |
| 10 | Intersection name | | |
| 11 | Point name | | |
| 12 | Non-linked point name | | |
| 13 | multimode point name | | in United Kingdom: Heathrow Air ort |
| 14 | submode point name | | in United Kingdom: Heathrow Airport-underground station |
| ... | ... | ... | ... |
| 39 | police force control area name | | |
| 40 | administrative reference name | | in United Kingdom: Highways agency road |
| 41 | Point-of-interest name | | |
| 42 | Parking facility name | | |
| 43 | service area name | | |
| 44 | link id End of version 3.0rv | | |

Figure 9:
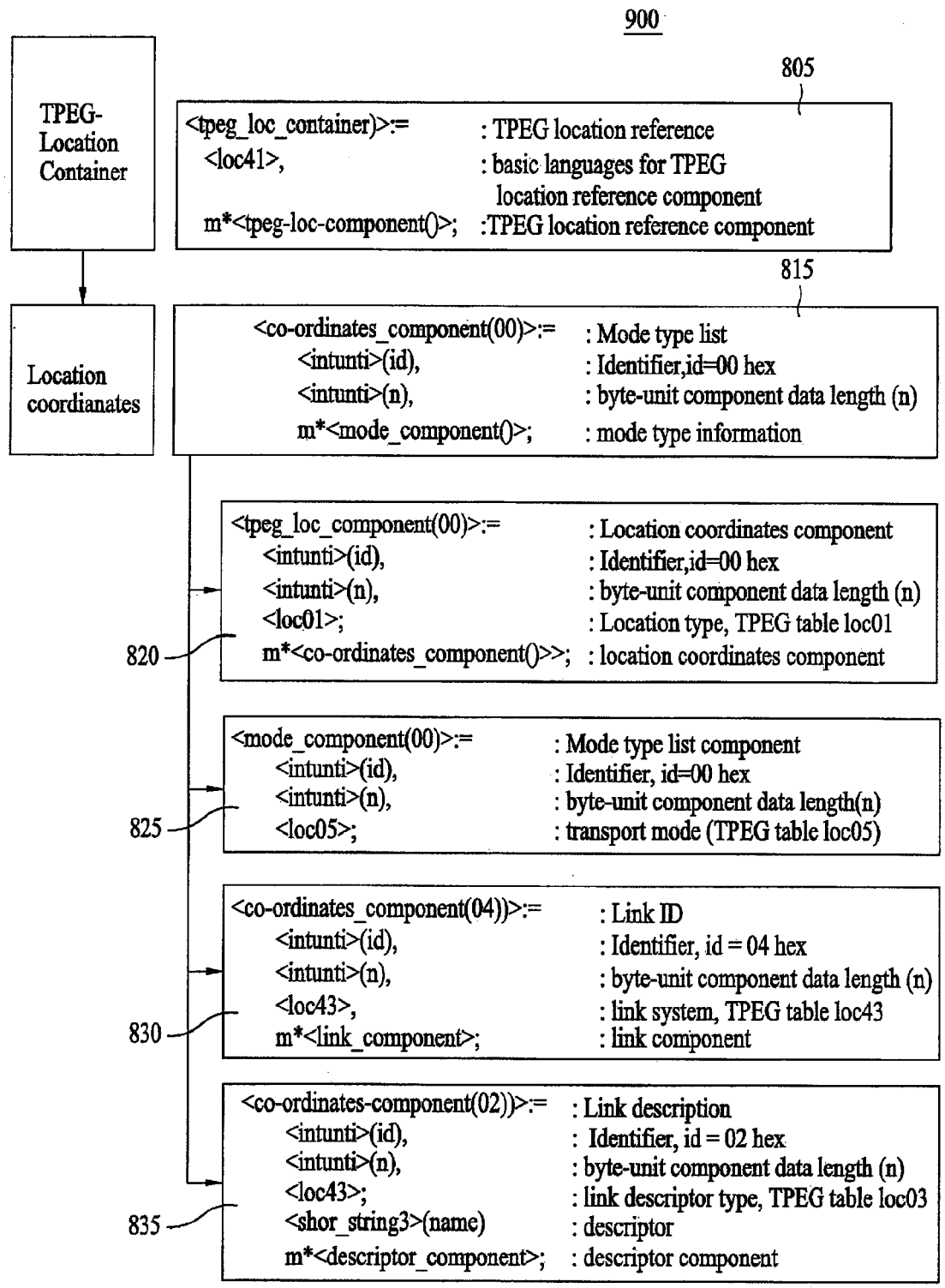
FIGS. 9 and 10 illustrate exemplarily data structures for a TPEG location container and a link identifier component, respectively.
Figure 10:
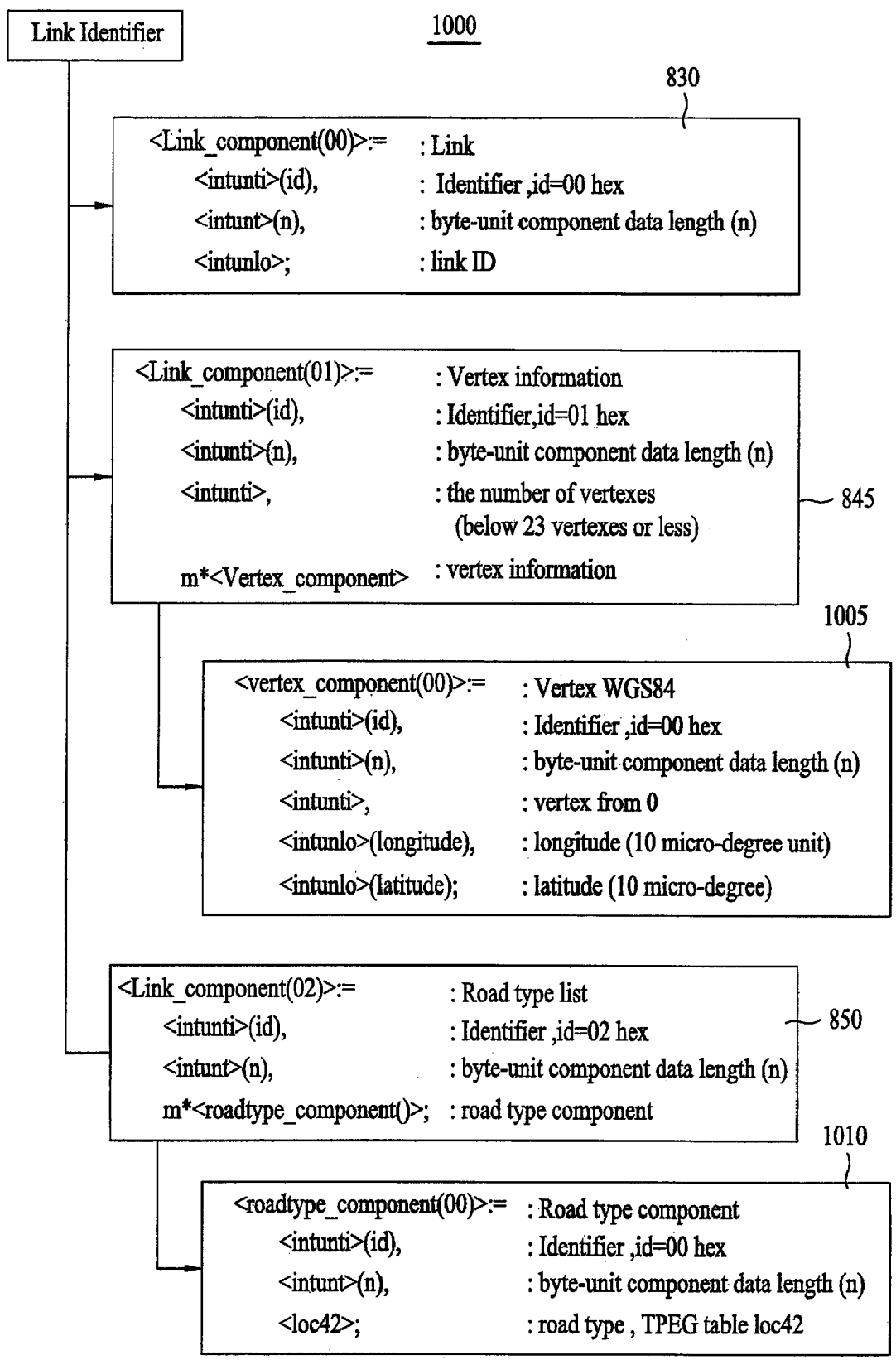

FIGS. 9 and 10 illustrate the exemplarily data structures for the TPEG location container 805 and the link identifier component 830, respectively. These components were previously discussed with respect to FIG. 8. The data structures described in FIGS. 9 and 10 are organized similarly to the data structures described in FIGS. 5, 6 and 7. Consequently, the data structures for components 805 and 830 are also specified using the C/C++ syntax. Likewise, the exemplarily data structures of FIGS. 9 and 10 may be assigned identifiers. The exemplarily data structures may also include pointers to other data structures. Thus, a data structure for the vertex information component 845 may include pointers to one or more data structures for a vertex component 1005. Similarly, a data structure for the road type list component 850 may include pointers to one or more data structures for a road type component 1010.

color, see a change in the numeral representing the congestion status, or see a change in the text representing the congestion status (e.g., "The traffic on K street has decreased to a level of 3"). The textual or numerical representation of the congestion status may be useful for situations when graphical maps are not available.

If a vehicle equipped with the TPEG terminal is traveling on a predetermined path, the average link speed information of links contained in the traveling path may be displayed instead of the forwarding links. This information may be obtained from the TPEG components 425, 430, and 435. Furthermore, if the additional information received from the TPEG decoder indicates a presence of a point of interest in a vicinity of the link, such as a famous restaurant or movie theater, the location of interest is displayed on the LCD display. That information may be obtained from the additional information component 420. Different points of interest may be displayed in distinct ways, so as to distinguish them from each other. Alternatively, points of interest may be indicated by a textual message.

A user may request to obtain a link travel time, a link delay time, and/or congestion type information associated with an individual link. A user may also request to obtain a predicted travel time or a predicted average speed. This information may be received from a TPEG decoder. In particular, this information may be obtained from the TPEG components 425-450 that are included in a TPEG message. The received information related to the predicted link speed may be displayed on the user instead of the current link speed.

In addition, the route to a destination may be computed or re-computed based on the predicted average link speed or predicted link travel time. For example, as described with respect to FIG. 2, the controller 210 may calculate a shortest route to a destination based on the predicted average link speed or predicted travel time. Thus, if the controller 210 determines that a user will be 30 minutes late because of traffic on a current route to the destination, the controller 210 may calculate a new route to the destination that avoids traffic and gets the user to the destination on time. The new route may be displayed on the LCD display 216. Furthermore, if the terminal 140 includes an audio output unit (or a voice output unit), any current traffic information or traffic status prediction information received from a designated link may be outputted in the form of voice or audio signals.

FIG. 12 is a flowchart illustrating an exemplary process 1200 for identifying at least one link. When the process 1200 begins (S1210), link information is received (S1220).

The link information includes a link identification value associated with a particular link, a link identifier component enabling a determination of a link system to be employed in identifying the particular link referenced by the received traffic information, and a location type information component enabling a determination of a link location type of the particular link. The link identifier component may include a link system identifier value.

A link system to be used to identify the particular link is determined based upon the link identifier component (S1230). The link system may be a standard link system. The link system to be used to identify the particular link may be determined by comparing the link system identifier value with an entry in a link system look-up table. The entry may be indicative of a standard link system.

The particular link from the received link information is identified based upon the determined link system and the link identification value (S1240). The link system may be a vertex-based link system, such that the link identification value is indicative of one or more vertices and identifying the particular link from the received link information is further based upon the one or more vertices. The link system may also be a reference string-based link system, such that the link identification value is indicative of a reference string and identifying the particular link from the received link information is further based upon the reference string.

Identifying the particular link from the received link information may include comparing the link identification value with an entry in a link identification look-up table. The particular link may be associated with a predetermined link identification value in the link identification look-up table. The link identification value may be unique to the particular link. Furthermore, identifying the particular link from the received traffic information may also include storing an entry in the link identification look-up table.

In addition, the link information may also include a link descriptor string value associated with the particular link, and a link descriptor component, the link descriptor component enabling a determination of a link descriptor type to be employed in identifying the link descriptor. A link descriptor type to be employed to identify links may be determined based upon the link descriptor component. The particular link descriptor from the received traffic information may also be identified based upon the determined link descriptor type and the link descriptor string.

The link location type of the particular link is determined based upon the location type information (S1250). The location type component may include a location type identifier value. Determining the link location type of the particular link may also include comparing the location type identifier value with an entry in a location type look-up table.

The determined link location type with the particular link referenced by the link identification value is associated based on identification of the particular link (S1260), and the process 1200 ends (S1270).

It is understood that various modifications may be made without departing from the spirit and scope of the claims. Thus, advantageous results still could be achieved if steps of the disclosed techniques were performed in a different order and/or if components in the disclosed systems were combined in a different manner and/or replaced or supplemented by other components.

The arrangements have been described with particular illustrative embodiments. It is to be understood that the concepts and implementations are not however limited to the above-described embodiments and that various changes and modifications may be made.

What is claimed is:

1. An apparatus for processing traffic information, the apparatus comprising:
   a receiving device configured to receive the traffic information in a Transport Protocol Expert Group (TPEG) format, the traffic information including:
      a link identifier of a link;
      vertex information of a vertex within the link, wherein the vertex information includes longitude and latitude information of the vertex;
      a location type information identifying a link location type of the link; and
   a decoding device configured to decode the traffic information.

2. The apparatus of claim 1 wherein the receiving device is configured to receive a link system identifier value.

3. The apparatus of claim 1 wherein the receiving device is configured to receive a location type identifier value.

4. The apparatus of claim 1, wherein the traffic information further includes a mode type list component identifying a transportation type.

5. The apparatus of claim 1, wherein the traffic information further includes a link descriptor component determining one of standardized link systems.

6. The apparatus of claim 1, wherein the link identifier includes a link identification value associated with the link.

7. The apparatus of claim 1, wherein the link identifier component includes a road type list component that identifies a type of a road.

* * * * *